United States Patent
Bezawada et al.

(10) Patent No.: US 11,172,380 B2
(45) Date of Patent: Nov. 9, 2021

(54) SYSTEMS AND METHODS FOR REAL-TIME ADAPTIVE ANTENNA FREQUENCY RESPONSE OPTIMIZATION FOR MULTI-CARRIER WIRELESS SYSTEMS

(71) Applicant: Apple Inc., Cupertino, CA (US)

(72) Inventors: Rajesh Bezawada, San Jose, CA (US); Harsha Shirahatti, Santa Clara, CA (US); Nischay Goel, San Jose, CA (US); Anil Kumar Goparaju, San Jose, CA (US); Aditya Prakash Kulkarni, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 16/256,896

(22) Filed: Jan. 24, 2019

(65) Prior Publication Data
US 2020/0245159 A1 Jul. 30, 2020

(51) Int. Cl.
*H04B 1/40* (2015.01)
*H04Q 1/50* (2006.01)
*H04B 1/04* (2006.01)
*H04W 24/02* (2009.01)
*H02J 3/02* (2006.01)
*H04B 1/18* (2006.01)

(52) U.S. Cl.
CPC .............. *H04W 24/02* (2013.01); *H02J 3/02* (2013.01); *H04B 1/0458* (2013.01); *H04B 1/18* (2013.01)

(58) Field of Classification Search
CPC .......... H04B 1/40; H04B 1/0458; H04B 1/04; H04B 1/18; H04W 52/288; H04W 52/28; H04W 24/02; H04M 2250/12; H02J 3/02
See application file for complete search history.

(56) References Cited

U.S. PATENT DOCUMENTS

| | | | |
|---|---|---|---|
| 8,712,354 B2* | 4/2014 | Zhang .................... | H04B 1/034 455/160.1 |
| 8,923,779 B2* | 12/2014 | Dubash .................. | H01Q 1/243 455/135 |
| 9,130,279 B1* | 9/2015 | Lee .......................... | H01Q 1/50 |
| 9,231,643 B2* | 1/2016 | Hoirup .................... | H04B 17/26 |
| 9,300,332 B2 | 3/2016 | Dakshinamurthy et al. | |

(Continued)

FOREIGN PATENT DOCUMENTS

| | | | |
|---|---|---|---|
| CN | 102098787 A | * | 6/2011 |
| CN | 209217209 U | * | 8/2019 |

*Primary Examiner* — Pablo N Tran
(74) *Attorney, Agent, or Firm* — Fletcher Yoder PC

(57) ABSTRACT

Systems, methods, and devices are provided for dynamically determining appropriate antenna tuning states for communication across one or more frequency bands. An electronic device may include a radio frequency system that facilitates wireless transmission and reception of data across multiple frequency bands. The electronic device may include a processor coupled to the radio frequency system. The processor may instruct the radio frequency system to obtain measurements for a candidate tuner state and a tuner state. Further, the processor may instruct the radio frequency system to determine whether the candidate tuner state provides better radio frequency system performance than the tuner state. Additionally, the processor may update the tuning table to reflect that results of which tuner state provides better radio frequency system performance.

18 Claims, 9 Drawing Sheets

(56) References Cited

U.S. PATENT DOCUMENTS

| | | | |
|---|---|---|---|
| 9,654,059 B2* | 5/2017 | Kuo | H03F 3/19 |
| 9,693,238 B2 | 6/2017 | Hu et al. | |
| 9,774,362 B1* | 9/2017 | Sammeta | H04B 1/40 |
| 2004/0085056 A1* | 5/2004 | Kosuga | H03J 1/0008 |
| | | | 324/71.1 |
| 2009/0311982 A1* | 12/2009 | Zhang | H03J 1/0091 |
| | | | 455/161.3 |
| 2010/0273441 A1* | 10/2010 | Dubash | H04B 1/18 |
| | | | 455/192.2 |
| 2012/0295554 A1* | 11/2012 | Greene | H01Q 1/50 |
| | | | 455/77 |
| 2015/0172426 A1* | 6/2015 | Asrani | H04B 1/40 |
| | | | 455/77 |
| 2016/0162783 A1* | 6/2016 | Tan | H04W 24/02 |
| | | | 706/13 |
| 2017/0005413 A1* | 1/2017 | Tai | H01Q 1/243 |
| 2017/0264335 A1* | 9/2017 | Hoirup | H04B 17/318 |
| 2018/0026664 A1 | 1/2018 | Greene et al. | |
| 2018/0048263 A1* | 2/2018 | Yun | G01R 27/26 |
| 2018/0269857 A1 | 9/2018 | Zachara | |
| 2019/0342891 A1* | 11/2019 | Asterjadhi | H04W 24/10 |

* cited by examiner

SYSTEMS AND METHODS FOR REAL-TIME ADAPTIVE ANTENNA FREQUENCY RESPONSE OPTIMIZATION FOR MULTI-CARRIER WIRELESS SYSTEMS

BACKGROUND

The present disclosure relates generally to radio frequency systems and, more particularly, to dynamically determining appropriate antenna tuning state(s) for communication across one or more frequency bands.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as smartphones and laptops, often include a radio frequency (RF) system to facilitate wireless communication of data with other electronic devices and/or networks. In some instances, the radio frequency system may facilitate wireless communication by receiving and/or transmitting wireless signals along one or more frequency bands via an antenna that is shared across multiple frequency bands. To communicate data along a particular frequency band or set of frequency bands using the antenna, antenna components may be adjusted (e.g., tuned) according to a current best tuner state that has been predetermined to be appropriate for the particular frequency band(s). In particular, the current best tuner state for a particular frequency band may be determined and set before implementation of the radio frequency system, such as in the factory. For example, to communicate signals using Bluetooth, the antenna may be configured to communicate along a 2.4 GHz frequency band by changing antenna component values in accordance with the single current best tuner state set for the particular frequency band.

However, during implementation of the radio frequency system, characteristics of the antenna may vary from the antenna characteristics used to predetermine the current best tuner state for the particular frequency band(s). In such cases, using the current best tuner state for the particular frequency band(s) may result in reduced signal strength and antenna performance during wireless transmission and/or reception.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to mitigating signal strength loss and reduced antenna performance arising from use of inappropriate (e.g., non-optimal) tuner state(s) for one or more frequency bands. Radio frequency systems may use a tunable antenna to transmit and/or receive wireless signals across multiple frequency bands. To select the frequency band(s), the tunable antenna may be tuned according to a current best tuner state that has been predetermined to be appropriate for the frequency band(s) and that is stored in a tuning table. However, in some embodiments, environmental factors may cause antenna characteristics to vary from the antenna characteristics used to predetermine the appropriate best tuner state. In such instances, using the current best tuner states may result in antenna detuning and thus, reduced communication accuracy.

To more accurately facilitate wireless communication via the tunable antenna, in some embodiments, an appropriate (e.g., optimal) best tuner state for one or more frequency bands may be dynamically determined from the set of predetermined tuner states available in the tuning table. In some embodiments, the radio frequency system may perform a scan cycle that involves obtaining measurements (e.g., signal strength) for each tuner state available in the tuning table. The radio frequency system may subsequently perform a confirmation cycle to determine whether another tuner state (e.g., candidate tuner state) of the tuning table provides better RF communication performance for the selected frequency band(s) than the current best tuner state. In particular, the measurements for each tuner state may be compared to determine one or more viable candidate tuner states for the frequency band(s). Once the candidate tuner state(s) have been determined, confirmation tests may be conducted on the candidate tuner state(s) and the current best tuner state to verify that the candidate tuner state(s) is more appropriate for the frequency band(s) than the current best tuner state.

Upon confirming that the candidate tuner state(s) is more appropriate for the particular frequency band(s), the radio frequency system may perform an update cycle. The update cycle may involve re-ranking the tuner states according to results of the confirmation cycle and reordering the position of the tuner states in the tuning table based on the new rank(s). As such, the tuning table may be dynamically updated to reflect appropriate tuner states for communication across the frequency band(s) via the tunable antenna.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
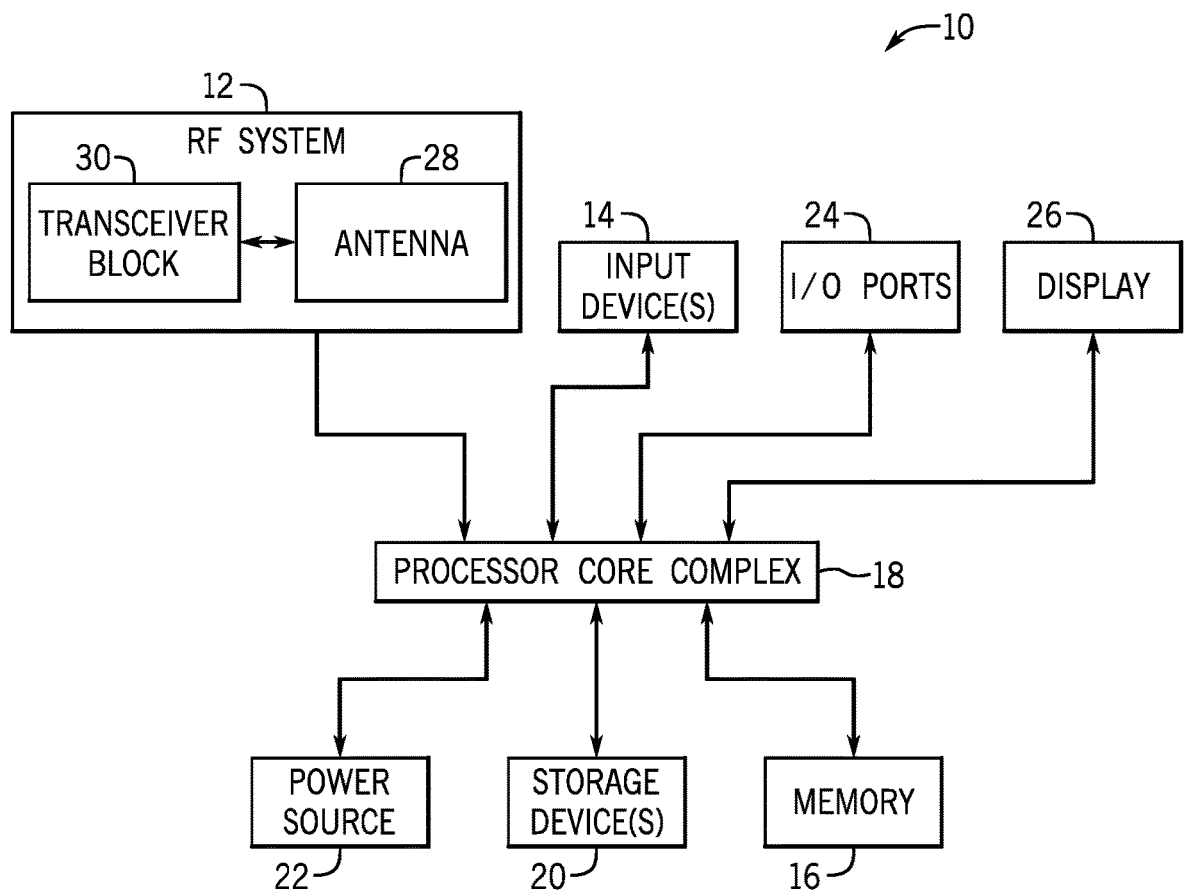
FIG. 1 is a block diagram of an electronic device with a radio frequency system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to radio frequency systems used to facilitate wireless communication of data between electronic devices and/or networks. For example, the radio frequency system may wirelessly communicate data by transmitting wireless signals (e.g., radio waves) modulated in a manner representative of a communication protocol used, such as a personal area network (e.g., Bluetooth network), a local area network (e.g., an 802.11x Wi-Fi network), a wide area network (e.g., a 4G, 5G, or Long Term Evolution (LTE) cellular network), and/or a global navigation network (e.g., GPS).

Because each communication protocol may operate at different frequency bands, the radio frequency system may include a tunable (e.g., reconfigurable) antenna or an antenna array that has at least two antennas that may transmit and/or receive wireless signals across multiple frequency bands. Briefly, tunable antennas may include a tuning mechanism that adjusts frequency and radiation properties of the antenna in a controlled manner. The tuning mechanism may include an array (e.g., bank) of passive components, such as inductors, capacitors, and/or resistors, of which at least a portion of the passive components may be tunable (e.g., adjustable) to different values (e.g., tuner state) based on the transmission frequency band of the communication protocol. For example, the inductor and capacitor values may be tuned to create a bandpass filter centered at the frequency band.

The tuner states for one or more frequency bands may be stored in a tuning table that is referenced by the radio frequency system. In particular, during manufacturing or testing, combinations of passive component values may be tested for each frequency band or set of frequency bands to determine RF communication performance under each tuner state. Based on empirical data of the RF communication performance, the tuner states may be ranked for the frequency band(s) and may be stored in a static tuning table onboard the electronic device. In other words, the tuning table may store a fixed mapping of the tuner states for each of the frequency bands. To communicate using a particular communication protocol, the radio frequency system may tune the antenna according to the tuner state ranked as enabling the best RF communication performance for the frequency band.

During implementation of the radio frequency system however, conditions under which the tuner states were mapped may vary significantly. For example, antenna characteristics (e.g., gain, radiation pattern, impedance, resonant frequency, polarization, and the like) may change (e.g., antenna detuning) when a passive accessory piece is placed onto the electronic device and causes antenna interference. As another example, antenna characteristics may vary based on a user's skin type, moisture content of the user's skin, watch band type, and the like. In such cases, using the predetermined current best tuner state for the frequency band may result in reduced antenna performance and communication accuracy.

Accordingly, the present disclosure provides systems and methods to mitigate signal strength loss and reduced antenna performance arising from use of inappropriate (e.g., non-optimal) tuner states for one or more frequency bands. In some embodiments, the radio frequency system may periodically perform a scan cycle to measure wireless communication parameters under each tuner state of the tuning table. In particular, when certain entry criteria are met, such as absence of voice calls, the antenna may be tuned to the current best tuner state for the frequency band(s). Measurements (e.g., received signal strength indicator (RSSI), reference signal received power (RSRP)) may be obtained for the current best tuner state. Once the scan has been successfully completed and if additional tuner states are available in the tuning table, the antenna may be re-tuned to the next ranked tuner state and similar measurements may be obtained. Re-tuning and re-measuring may continue until the wireless communication parameters for each tuner state of the tuning table have been measured. In some embodiments, the tuning table may include all possible combinations of passive component values.

Further, in some embodiments, the radio frequency system may subsequently perform a confirmation cycle to determine whether another tuner state (e.g., candidate tuner state) provides better RF communication performance for the frequency band(s) than the current best tuner state. In particular, measurements obtained for each candidate tuner state may be compared to measurements obtained for the current best tuner state. In some embodiments, the measurements for each candidate tuner state may also be compared to one another. Upon determining that a candidate tuner state provides better performance for the frequency band(s), confirmation tests may be performed to verify that the candidate tuner state is more appropriate. For example, the confirmation tests may include repeating the measurements according to a difference in rank between the candidate tuner state and the tuner state that the candidate tuner state may replace.

Additionally, in some embodiments, when performance improvement is consistently observed under the candidate tuner state for the frequency band(s), the radio frequency system may perform an update cycle. The update cycle may include re-ranking the tuner states according to results of the confirmation cycle and reordering the tuning table for the frequency band based on the new rank(s). In this way, the radio frequency system may ensure communication accuracy regardless of the environmental conditions of the radio frequency system. Additional details with regard to the dynamic determination of appropriate tuner states using the embodiments described herein are detailed below with references to FIGS. 1-11.

By way of introduction, an embodiment of an electronic device 10 that includes a radio frequency system 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the radio frequency system 12, one or more input devices 14, local memory 16, a processor core complex 18, one or more storage devices 20, a power source 22, one or more input/output (I/O) ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and the storage device 20 may be included in a single component.

As depicted, the processor core complex 18 is operably coupled to the local memory 16 and the storage device 20. Thus, the processor core complex 18 may execute instructions stored in the local memory 16 and/or the storage device 20 to perform operations, such as instructing the radio frequency system 12 to communicate with another electronic device and/or network. As such, the processor core complex 18 may include one or more general purpose microprocessors, one or more application specific processors (ASICs), one or more field programmable logic arrays (FPGAs), or any combination thereof.

In addition to the instructions, the local memory 16 and/or the storage device 20 may store data to be processed by the processor core complex 18. As an example, the local memory 16 and/or the storage device 20 may store the tuning table used to tune an antenna of the radio frequency system 12. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable nonvolatile memory such as flash memory, hard drives, optical discs, and the like.

As depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Additionally, as depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Furthermore, as depicted, processor core complex 18 is operably coupled with the input devices 14. In some embodiments, the input devices 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As depicted, the processor core complex 18 is also operably coupled with the radio frequency system 12. As described above, the radio frequency system 12 may facilitate wireless communication of data with another electronic device and/or network. For example, the radio frequency system 12 may enable the electronic device 10 to communicatively couple to a personal area network (PAN), such as a Bluetooth network, a local area network (LAN), such as an 802.11x Wi-Fi network, a wide area network (WAN), such as a fourth-generation wireless technology (4G), 5G, or LTE cellular network, and/or a global navigation network (e.g., GPS). In other words, the radio frequency system 12 may enable wireless communication of data using various communication protocols and/or at various output powers (e.g., strength of transmitted analog electrical signals).

In particular, the radio frequency system 12 may be implemented to support multiple communication protocols. As such, hardware of the radio frequency system 12 may be tailored to support transmission and reception of wireless signals across multiple frequency bands. In one embodiment, the radio frequency system 12 may include a tunable antenna 28 that can be configured to communicate signals across a frequency band. For example, values of passive components (e.g., capacitors and/or inductors) of the antenna 28 may be adjusted by the processor core complex 18 based on the current best tuner state of the tuning table associated with the frequency band. In some embodiments, the radio frequency system 12 may include a dedicated processor that controls the tuning of the antenna 28. Additionally, the antenna 28 may also be coupled to a transceiver block 30 that facilitates processing of received and transmitted wireless signals.

Figure 2:
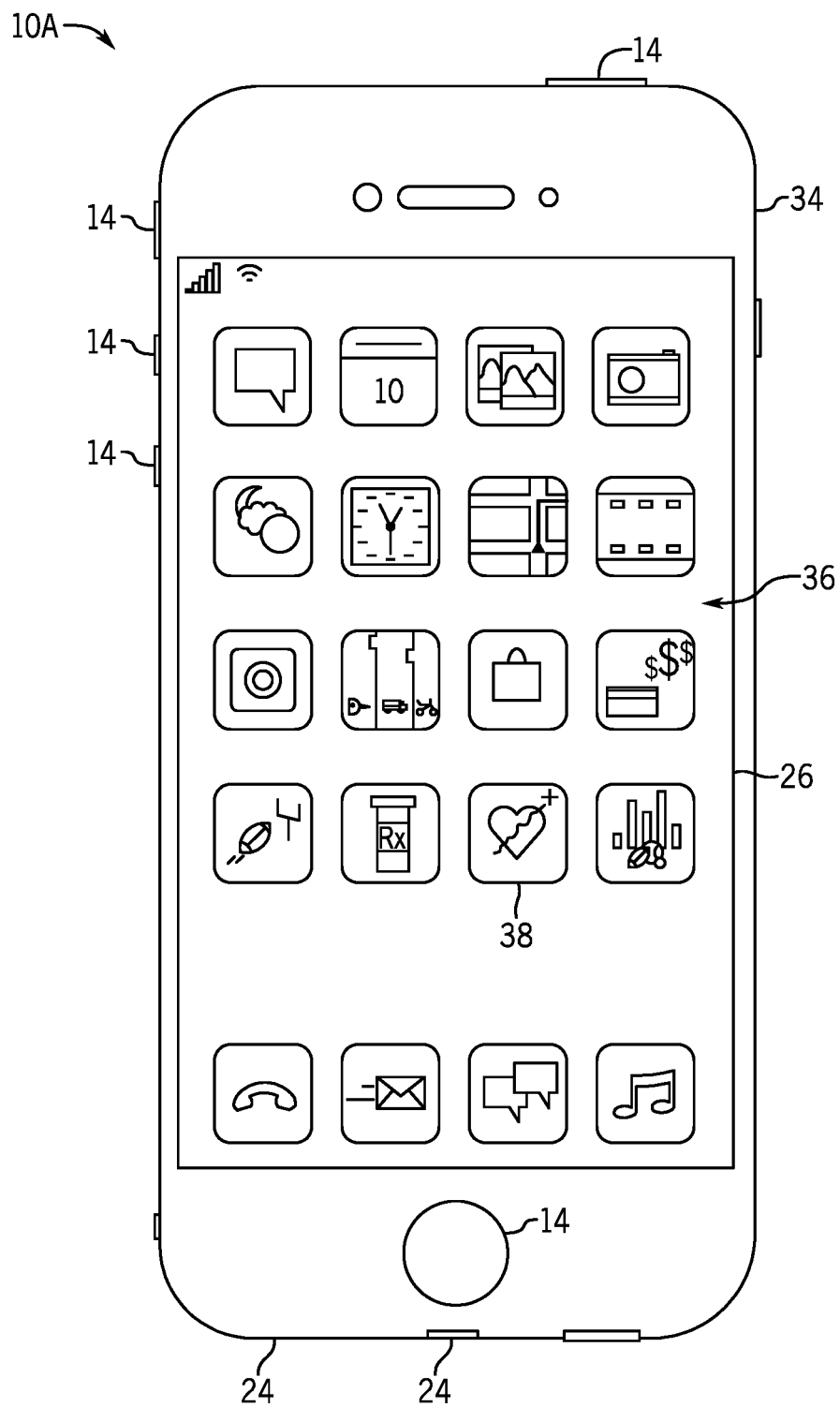
FIG. 2 is a front view of a hand-held device representing an example of the electronic device of FIG. 1, in accordance with an embodiment.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the antenna 28.

Additionally, as depicted, the enclosure 34 may surround the electronic display 26. In the depicted embodiment, the electronic display 26 is displaying a graphical user interface (GUI) 36 having an array of icons 38. By way of example, when an icon 38 is selected either by an input device 14 or a touch sensing component of the electronic display 26, an application program may launch.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, a multi-function connector port (e.g., Lightning port) to connect to external devices.

Figure 3:
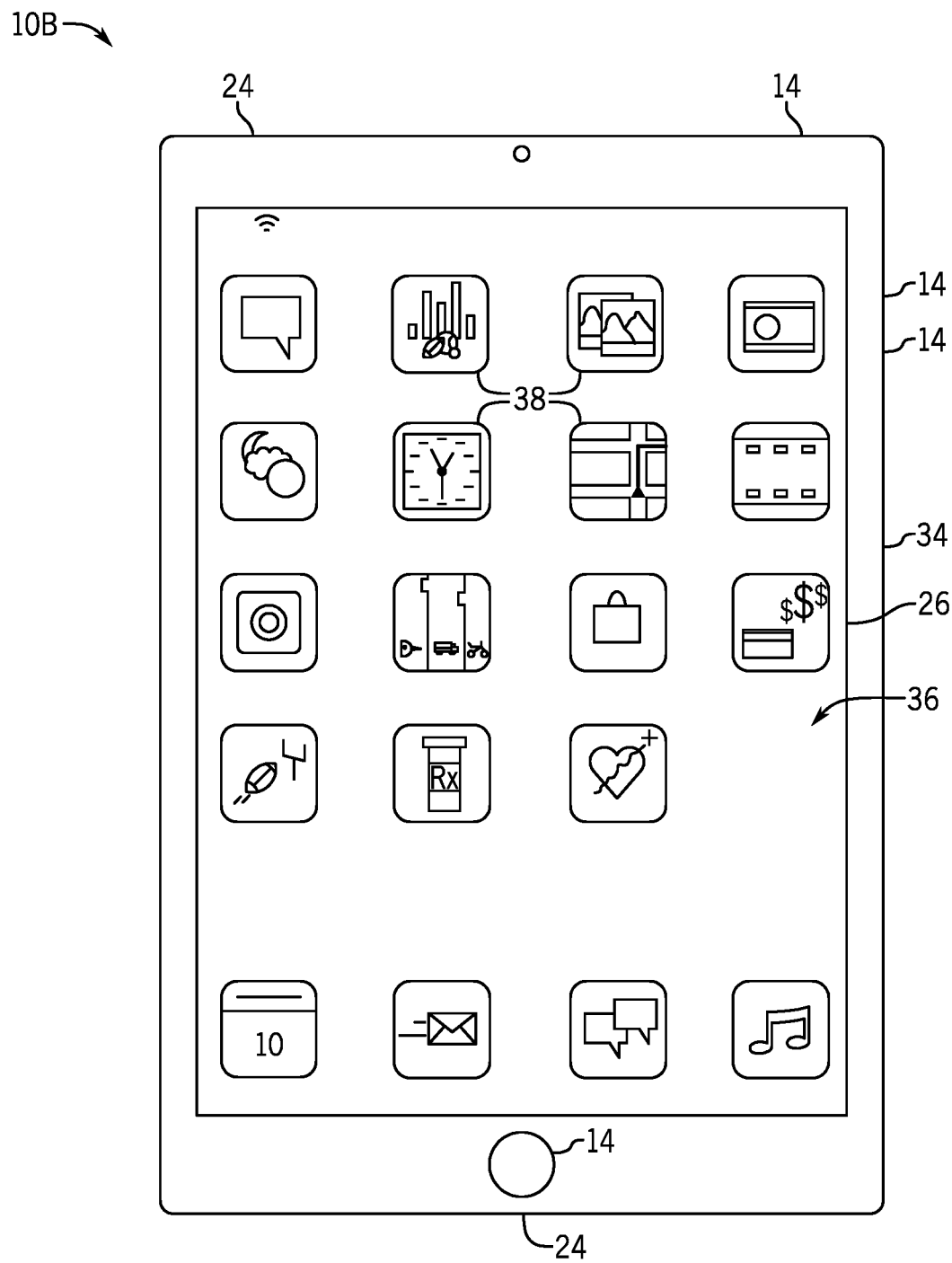
FIG. 3 is a front view of another hand-held device representing another example of the electronic device of FIG. 1, in accordance with an embodiment.
Figure 4:
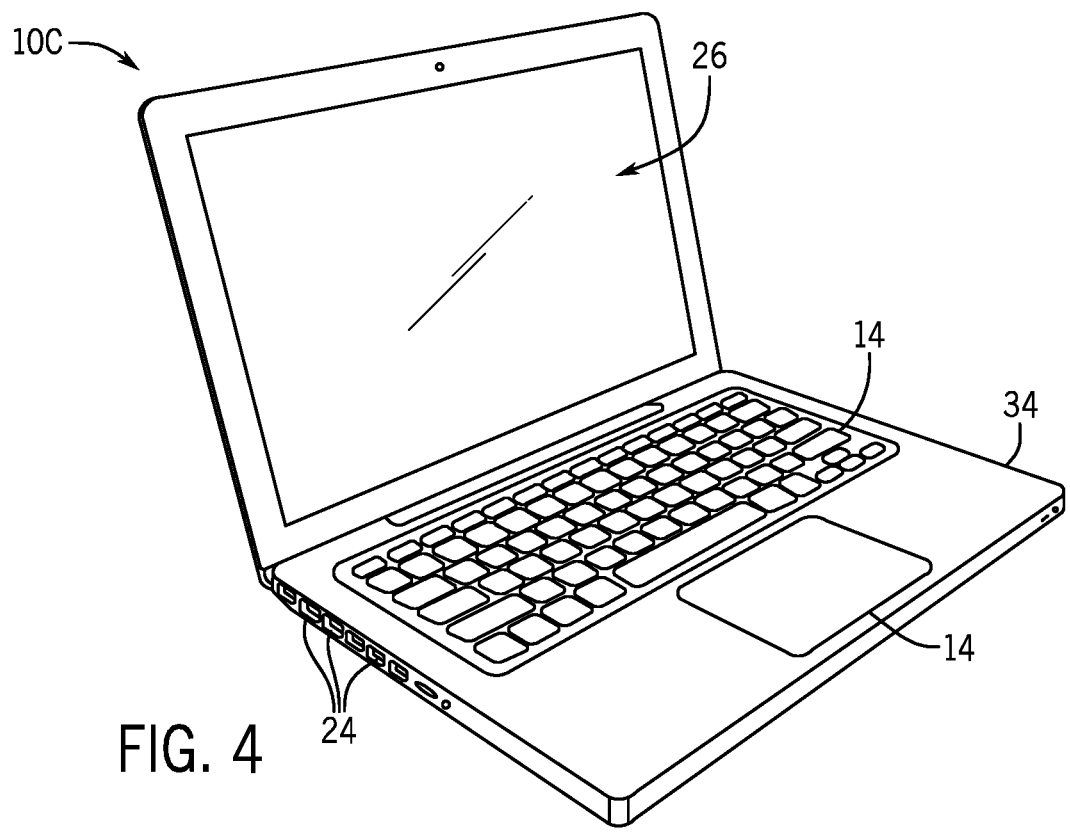
FIG. 4 is a perspective view of a notebook computer representing another example of the electronic device of FIG. 1, in accordance with an embodiment.
Figure 5:
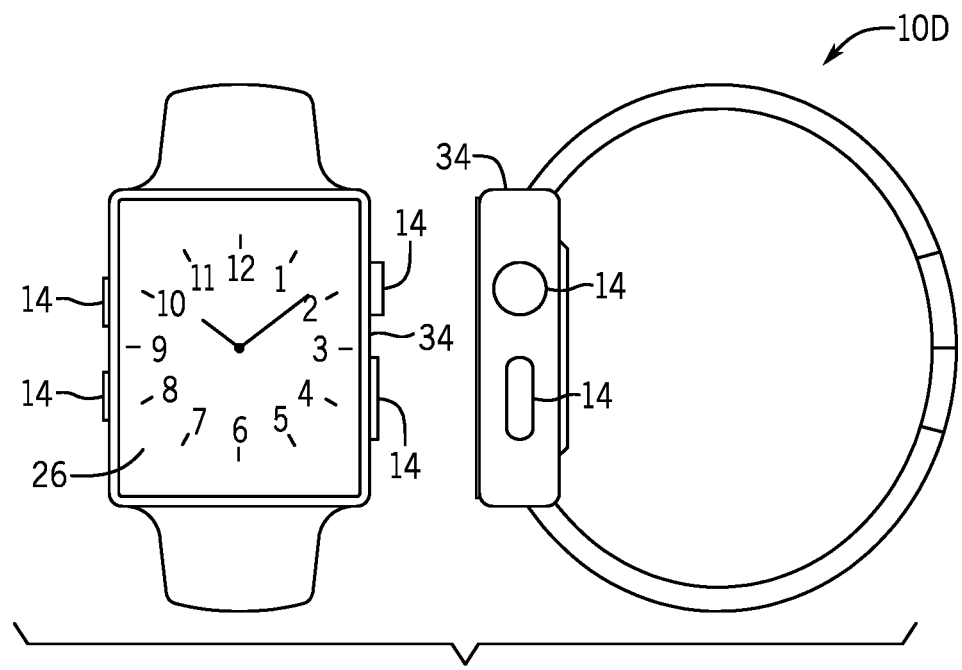
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose the radio frequency system 12 in the tablet electronic device 10B, the computer 10C, and/or the watch 10D to facilitate wireless communication of data with other electronic devices and/or a network.

Figure 6:
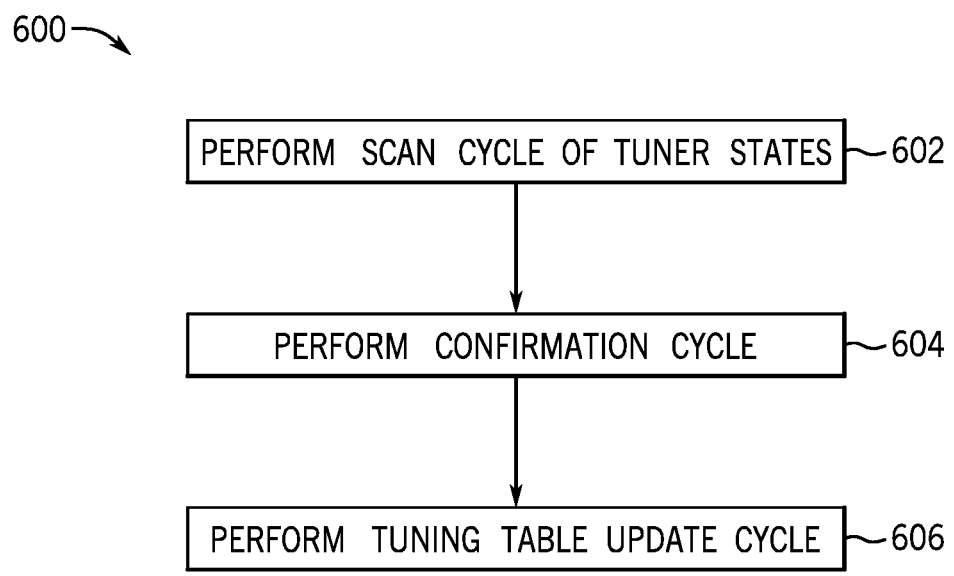
FIG. 6 is a process for dynamically determining appropriate tuner states for one or more frequency bands, in accordance with an embodiment.

With the preceding discussion in mind, FIG. 6 depicts a process 600 for dynamically determining appropriate tuner states for communication across one or more frequency bands, in accordance with an embodiment. While the process 600 is described according to certain sequences, it should be understood that the present disclosure contemplates that the described steps may be performed in different suitable sequences than the sequence illustrated, and certain described steps may be skipped or not performed altogether. In some embodiments, the process 600 may be implemented at least in part by executing instructions stored in a tangible, non-transitory, computer-readable medium, such as the memory 20, using processing circuitry, such as the processor core complex 18 or a separate controller designated for the radio frequency system 12. Additionally or alternatively, the process 600 may be implemented at least in part by circuit connections and/or control logic implemented in the electronic device 10.

Briefly, the process 600 may be initiated when the processor core complex 18 instructs the radio frequency system 12 to perform a scan cycle of the tuner states available in the tuning cycle (process block 602). During the scan cycle, measurements reflective of the radio frequency system's 12 performance may be obtained for each tuner state. The processor core complex 18 may then instruct the radio frequency system 12 to perform a confirmation cycle (process block 604). During the confirmation test, the radio frequency system 12 may determine and verify candidate tuner states that enable greater RF communication performance for the particular frequency band(s) than the current best tuner state mapped to the particular frequency bands during manufacturing or testing. Further, the processor core complex 18 may instruct the radio frequency system 12 to perform an update cycle to dynamically update the tuning table with an appropriate tuner state mapping when one or more better candidate tuner states have been determined and verified (process block 606).

Figure 7:
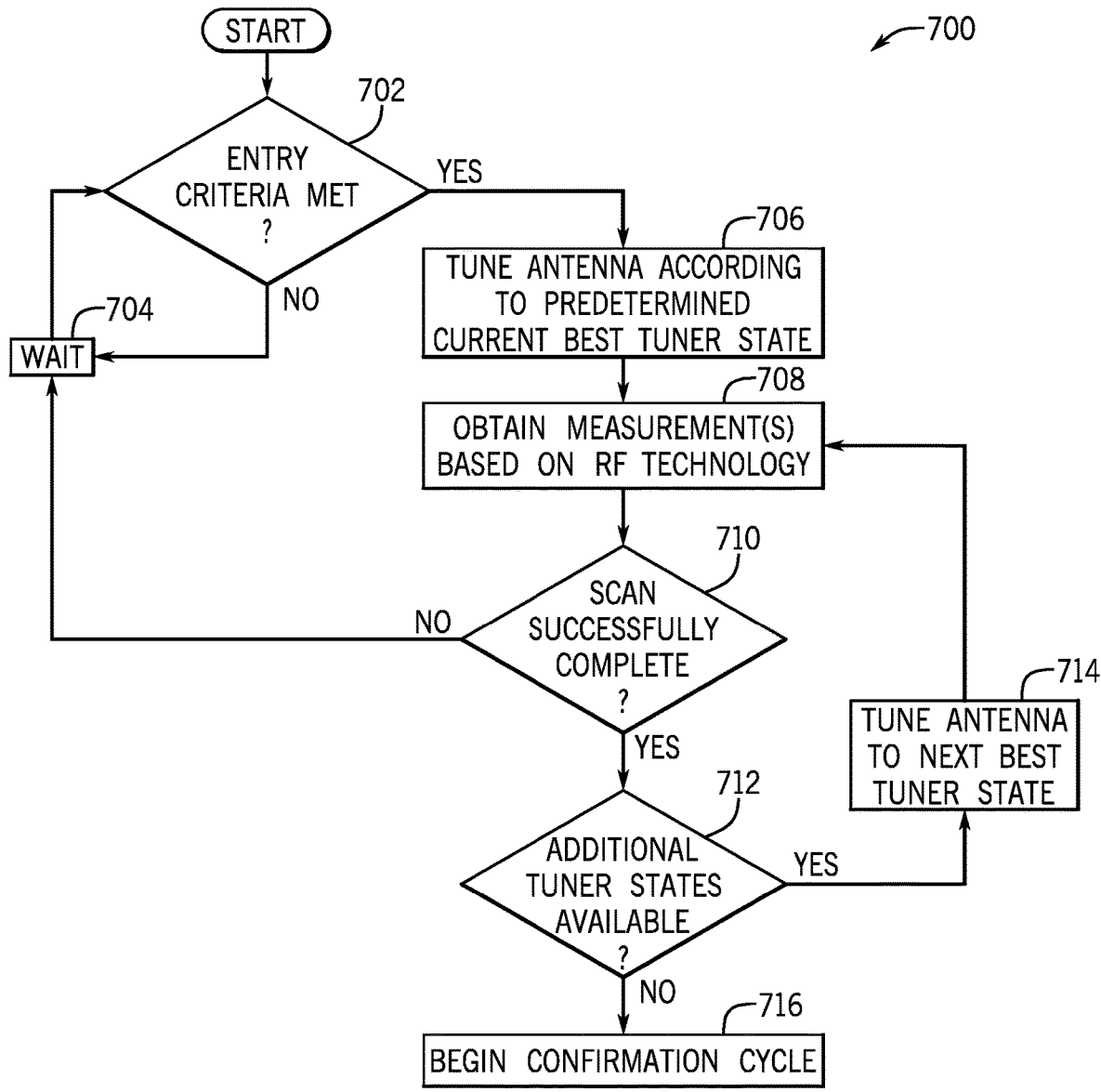
FIG. 7 is a process for performing a scan cycle for each tuner state, in accordance with an embodiment.

To help illustrate, an example of a process 700 for performing the scan cycle (process block 602) is described in FIG. 7, in accordance with an embodiment. While the process 700 is described according to certain sequences, it should be understood that the present disclosure contemplates that the described steps may be performed in different suitable sequences than the sequence illustrated, and certain described steps may be skipped or not performed altogether. In some embodiments, the process 700 may be implemented at least in part by executing instructions stored in a tangible, non-transitory, computer-readable medium, such as the memory 20, using processing circuitry, such as the processor core complex 18 or a separate controller designated for the radio frequency system 12. Additionally or alternatively, the process 700 may be implemented at least in part by circuit connections and/or control logic implemented in the electronic device 10.

Generally, the process 700 may begin by determining whether entry criteria for entering the scan cycle have been met (decision block 702). For example, for cellular communication, the processor core complex 18 may determine whether the electronic device 10 is in service, certain signal parameters (e.g., reference signal received power (RSRP), received signal strength indication (RSSI)) are above their respective thresholds (e.g., rsrp_entry_threshold greater than −90 dBm, rssi_entry_threshold greater than −90 dBm), and/or no cellular traffic (e.g., voice calls, data call) is present. In some embodiments, the entry criteria for cellular communication may include criteria that are independent of signal environment.

As another example, entry criteria for global navigation communication (e.g., Global Navigation Satellite System (GNSS)) may include determining whether current position accuracy is between a minimum accuracy specification set by a subscribed client and a maximum accuracy threshold (e.g., accuracy_entry_threshold of 20 meters). Further entry criteria for GNSS may include meeting a minimum threshold of satellite vehicles (SVs) that have an acceptable carrier-to-noise density ratio (e.g., 3 SVs with a carrier-to-noise density ratio greater than 30 dB-Hz). Additionally or alternatively, entry criteria for GNSS may include determining, via motion sensors, that the electronic device 10 using GNSS communication is in an in-vehicle state, a mounted state, and/or a non-onbody state. Specifically, the states may ensure that the GNSS signal is not affected by movement, orientation, and interactions with the human body, respectively. In some embodiments, the entry criteria for GNSS communication may include criteria that are independent of signal environment.

If one or more entry criteria are not met, then the processor core complex 18 may instruct the radio frequency system 12 to wait for an interval of time (e.g., scan_interval) before re-evaluating whether the entry criteria have been met (process block 704). In some embodiments, the time interval for cellular communication may be configurable. For example, the time interval may be a length of a paging cycle of the electronic device 10, which may vary between devices. Additionally or alternatively, the time interval when scanning for GNSS communication may also be configurable, such as every 10 minutes or at a start of each GPS session.

If the entry criteria have been met, the processor core complex 18 may instead instruct that the antenna 28 be tuned to the predetermined current best tuning state for the particular frequency band(s) (process block 706). For example, for a frequency band associated with Bluetooth communication, the antenna 28 may be tuned according to the tuner state in the first row of the tuning table.

Once the antenna 28 has been tuned, the radio frequency system 12 may begin obtaining measurements related to RF communication performance (process block 708). For cellular communication, the measurements may include determining the average RSSI during a specified scan duration (e.g., scan_duration of 2 seconds). The RSSI is an indication of power level received by a receiver of the transceiver block 30 after antenna and transmission cable losses. The greater the RSSI measurement value, the stronger the received wireless signal is. Further, the measurements may include determining the average RSRP during the specified scan duration. The RSRP is an indication of the power received from a single reference signal and the lower the value in dBm, the more accurate the communication.

For GNSS communication, the measurements may include determining the average carrier-to-noise density ratio of the SVs during a specified scan duration. In some embodiments, the scan duration may be 10 seconds. Additionally or alternatively, the scan duration may be configured to a different length of time based on the signal stability. The measurements for GNSS communication may also include measuring the elevation angle of the SVs.

Once the appropriate measurements have been obtained, the processor core complex 18 may determine whether the scan was completed successfully and thus, whether the measurements obtained were accurate (decision block 710). In some embodiments, a scan is successfully completed for cellular communication when the entry criteria are met, the exit criteria are not met, and the RSRP/RSSI measurements are obtained from a same base station (BS) as those measurements obtained for a previous tuner state. Briefly, the exit criteria for cellular communication may include loss of service, cellular traffic, variations in user dynamics (e.g., grip detected around electronic device 10), and/or variations in radio frequency dynamics (e.g., different base station used between tuner state scans, cell reselection—radio access technologies (RAT) handover). The exit criteria for cellular communication may also include spending more than a maximum threshold of time (e.g., 10 minutes) in a learning session of process 600.

In some embodiments, a scan is successfully completed for GNSS communication when the entry criteria are met, the exit criteria are not met, the number of SVs remains consistent between the current scan and a scan of the previous tuner state, and/or the identification of the SVs used in the carrier-to-noise density ratio measurements remains consistent between the current scan and a scan of the previous tuner state. Briefly, the exit criteria for GNSS communication may include change in dynamics (e.g., user makes a u-turn), no availability of carrier-to-noise measurements due to, for example, the user entering a tunnel, and/or time spent in a learning session of process 600 exceeds the maximum threshold time. Further exit criteria for GNSS communication may include motion sensors detecting that the electronic device 10 facilitating GNSS communication is not in in-vehicle state, mounted state, and/or onbody state.

Regardless of the radio frequency technology being used by the electronic device 10, if one or more criteria for a successful scan are not met, the process 700 may proceed to wait for an interval of time (process block 704). If the scan is determined to be successful, the processor core complex 18 may determine whether additional tuner states are available in the tuning table associated with the radio frequency technology (decision block 712). As previously mentioned, the tuner states stored in the tuning table may include all possible combinations of passive component values. Each radio frequency technology, and thus set of frequency bands, may be associated with a tuning table that holds the tuner states according to a predetermined ranking of RF communication performance for that frequency band.

When the tuning table includes additional tuner states, the antenna 28 may be tuned to the next best tuner state (e.g., tuner state in next row of tuning table) (process block 714). When the tuning table does not include additional tuner states, for example, since the measurements have been obtained for each tuner state, the processor core complex 18 may instruct the radio frequency system to begin the confirmation cycle (process block 716). In this way, measurements may be obtained for each tuner state.

It should be appreciated that while process 700 is discussed in terms of cellular and GNSS technologies, the present disclosure contemplates implementation of process 700 for other radio frequency technologies, such that entry criteria, measurements, and so forth are tailored to be reflective of the performance and state of the radio frequency system 12 when the other radio frequency technologies are implemented.

Figure 8:
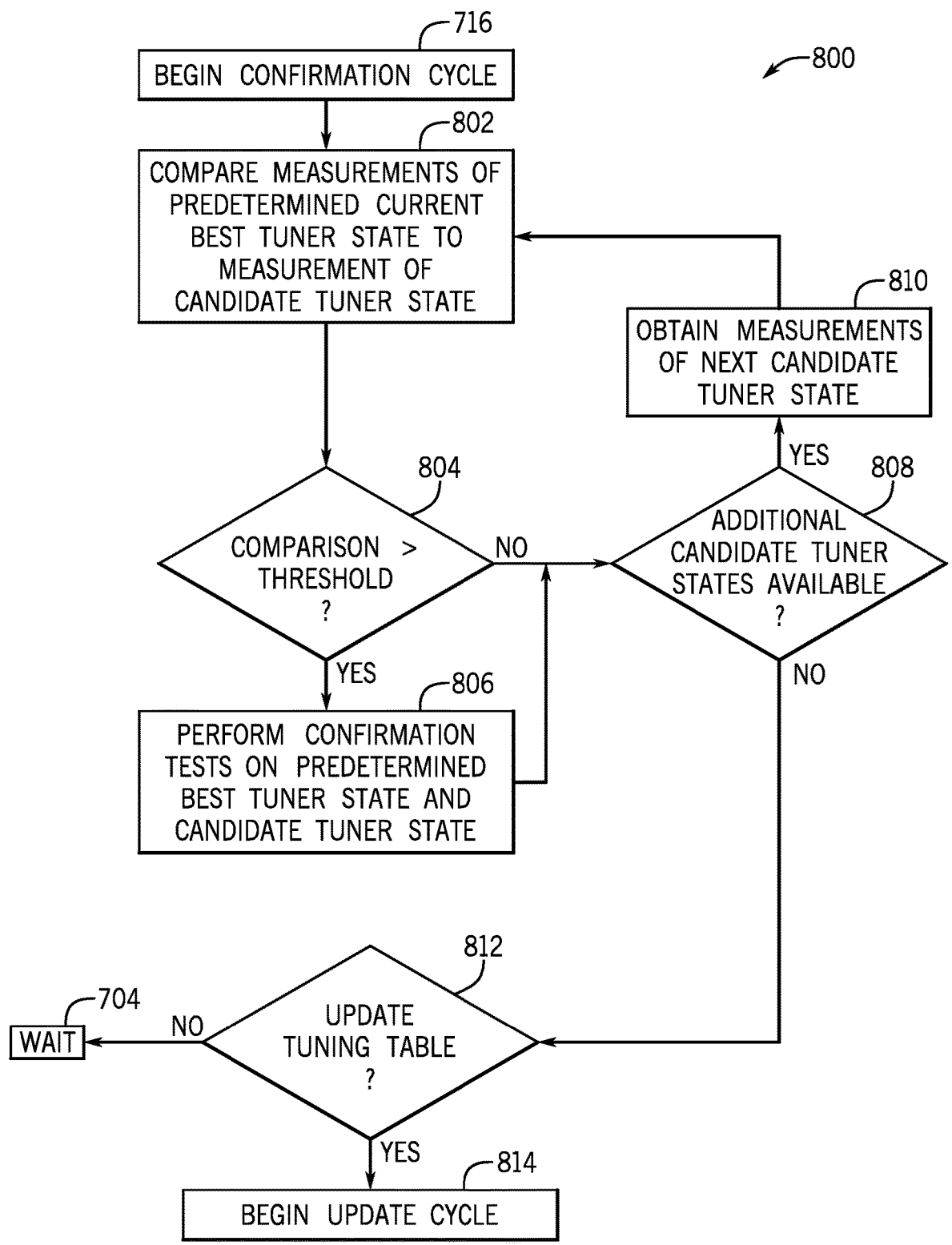
FIG. 8 is a process for performing a confirmation cycle to determine and verify candidate tuner state(s) for the one or more frequency bands, in accordance with an embodiment.

FIG. 8 illustrates a process 800 for performing the confirmation cycle to determine and verify an appropriate mapping of tuner states for the particular frequency band(s), in accordance with an embodiment. While process 800 is described according to certain sequences, it should be understood that the present disclosure contemplates that the described steps may be performed in different suitable sequences than the sequence illustrated, and certain described steps may be skipped or not performed altogether. In some embodiments, the process 800 may be implemented at least in part by executing instructions stored in a tangible, non-transitory, computer-readable medium, such as the memory 20, using processing circuitry, such as the processor core complex 18 or a separate controller designated for the radio frequency system 12. Additionally or alternatively, the process 800 may be implemented at least in part by circuit connections and/or control logic implemented in an electronic device 10.

Generally, the confirmation cycle may begin by comparing the measurements of the current best tuner state to the measurements of another tuner state (e.g., candidate tuner state) held in the tuning table (process block 802). In some embodiments, the comparison for cellular communication may involve determining the difference between the RSSI measurements of the current best tuner state and the candidate tuner state (e.g., rssi_previous_state-rssi_current_state). Further, the comparison may involve finding the difference between the RSRP measurements of current best tuner state and the candidate tuner state (e.g., rsrp_previous_state-rsrp_current_state). In some embodiments, the comparison for GNSS communication may involve determining the difference between the carrier-to-noise density ratio measurements of the current best tuner state and the candidate tuner state (e.g., cn0_previous_state-cn0_current_state).

The processor core complex 18 may determine whether the comparison results are greater than an acceptable threshold to determine whether the candidate tuner state provides statistically significant performance improvement over performance under the current best tuner state (decision block 804). For example, for cellular communication, the RSSI comparison value may be compared to a RSSI threshold of 2 dB and the RSRP comparison value may be compared to a RSRP threshold of 2 dB. As another example, for GNSS communication, the carrier-to-noise density ratio comparison value may be compared to a carrier-to-noise density ratio threshold of 2 dB. In some embodiments, the RSSI, RSRP, and carrier-to-noise density thresholds may be configurable based on design specifications for the radio frequency system 12, for example, to an upper limit of 7-8 dB.

If the comparison results demonstrate statistically significant performance improvement, confirmation tests may be performed on the compared tuner states (process block 806). In some embodiments, the confirmation tests may include repeating the measurements for the compared tuner states based on the difference in rank of the current best tuner state and the candidate tuner state. For example, when a candidate tuner state, which has been predetermined to lower antenna performance for the frequency band (e.g., candidate tuner state with rank of 4), is trying to replace the current best performing tuner state for the frequency band (e.g., tuner state with rank of 1), confirmation tests may be repeated a maximum number of times (e.g., 5 times). As another example, when a candidate tuner state of the same rank (e.g., rank 2) as a current best tuner state is trying to replace the current best tuner state, confirmation tests may be repeated for a minimum number of times (e.g., 2 times). In some embodiments, the candidate tuner state must perform better in all confirmation test to replace the current best tuner state. After performing the confirmation tests, the processor core complex 18 may determine whether additional candidate tuner states are available (decision block 808).

Further, if the comparison results do not demonstrates statistically significant performance improvement, the processor core complex 18 may also determine whether additional candidate tuner states are available (decision block 808). That is, the processor core complex 18 may determine whether other tuner states exist within the tuning table. When additional candidate tuner states are available, the processor core complex 18 may retrieve measurements for the next candidate tuner state and facilitate comparing the measurements of the current best tuner state and the next candidate tuner state (process block 810, 802). When additional candidate tuner states are not available, the processor core complex 18 may determine whether the tuning table should be updated based on the results of the confirmation test (decision block 812). If tuning table should be updated, the radio frequency system 12 may begin performing the update cycle (process block 814). If the tuning table should not be updated, the radio frequency system 12 may wait for an interval time before the process 600 is repeated (process block 704).

It should be appreciated that all permutations of tuner state pairs may be compared and verified using process 800. Additionally, while the present embodiment depicts comparing a pair of tuner states and subsequently performing confirmation test on the comparison, it should be appreciated that all pair permutations may be compared first and subsequently, confirmation tests may be performed in a single step for all pair permutations. Further, it should be understood that while the process 800 is discussed in terms of cellular and GNSS technologies, the present disclosure contemplates implementation of the process 800 for other radio frequency technologies, such that the comparisons are tailored to be reflective of the performance and state of the radio frequency system 12 when the other radio frequency technologies are implemented.

Figures 9, 10:
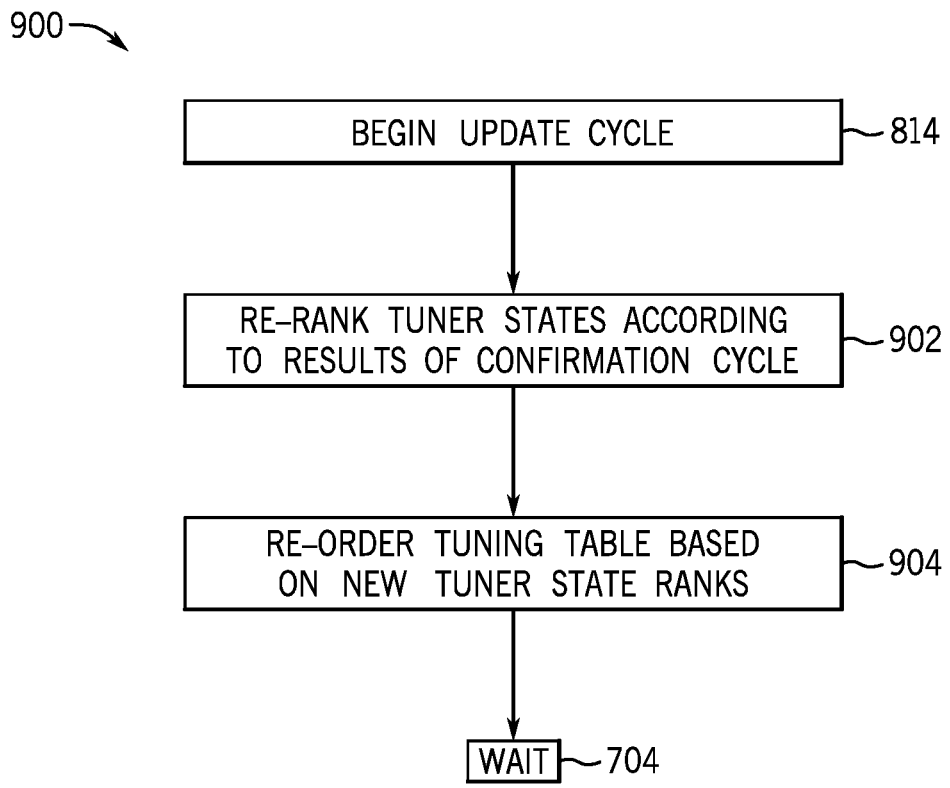
FIG. 9 is a process for performing an update cycle to update a tuning table storing the tuner states according to results of the confirmation cycle of FIG. 8, in accordance with an embodiment.
FIG. 10 is a table depicting an example of an updated tuning table, in accordance with an embodiment.

FIG. 9 illustrates a process 900 for performing an update cycle to update the tuning table according to the results of the confirmation cycle, in accordance with an embodiment. The update cycle may begin by re-ranking the tuner states according to the results of the confirmation cycle (process block 902). In particular, re-ranking the tuner states may include associating a higher performance rank (e.g., rank 1) to the better performing candidate tuner state and/or current best tuner state and a lower performance rank (e.g., rank 4) to the worse performing candidate tuner state and/or current best tuner state. The processor core complex 18 may subsequently facilitate re-ordering the tuning table according to the new ranks (process block 904). In some embodiments, the tuning table may be re-ordered in an ascending order of rank, such that the best tuner state for the radio frequency technology is in the first row of the tuning table. Finally, the radio frequency system 12 may wait for an interval time period before performing another iteration of process 600 (process block 704). As such, the appropriate tuner states for the frequency band(s), and thus, each radio frequency technology may be dynamically determined.

Additionally or alternatively, when an exit criteria occurs at any point in the process 600, the learning session may be abandoned and the radio frequency system 12 may wait for a period of time before starting the next scan cycle. In such cases, when exiting from the learning mode, the processor core complex 18 may attempt to determine whether any conclusions may be formed from the incomplete learning session. Further, based on the time for exiting the process 600, information from previous scans may be used to form the conclusion.

An example of the tuning table before and after process 600 has been implemented is show in in FIG. 10, in accordance with an embodiment. As shown, tuning table 1000 depicts the entries of the table before process 600 is applied. Each tuner state (e.g., State1 (0x01)) is associated with a rank value that reflects the RF communication performance when the antenna 28 is tuned in accordance to the tuner state. In this example, rank 1 indicates that the tuner state provides better communication performance than a state with a rank of 4. Thus, State1 may be considered the current best tuner state while State2, State3, and State4 may be considered candidate tuner states. As discussed above, the tuner states and mapped rankings may be determined empirically during manufacturing or testing. Further, the tuning table 1000 may be different for different radio frequency technologies and for different interfering sources, such as display on, display off, with charging, and without charging.

When the process 600 is applied to the tuning table 1000, the tuning table 1000 may be dynamically updated to reflect appropriate tuner states for the radio frequency technology.

As shown, the results of the confirmation test detailed in the process 800 confirmed that State3 and State1 enable similar radio frequency system performance. As such, the learned tuning table 1002 may be reordered to reflect that State3 and State1 are the best tuner states for the radio frequency technology while State2 and State4 are provide worse RF communication performance.

Figure 11:
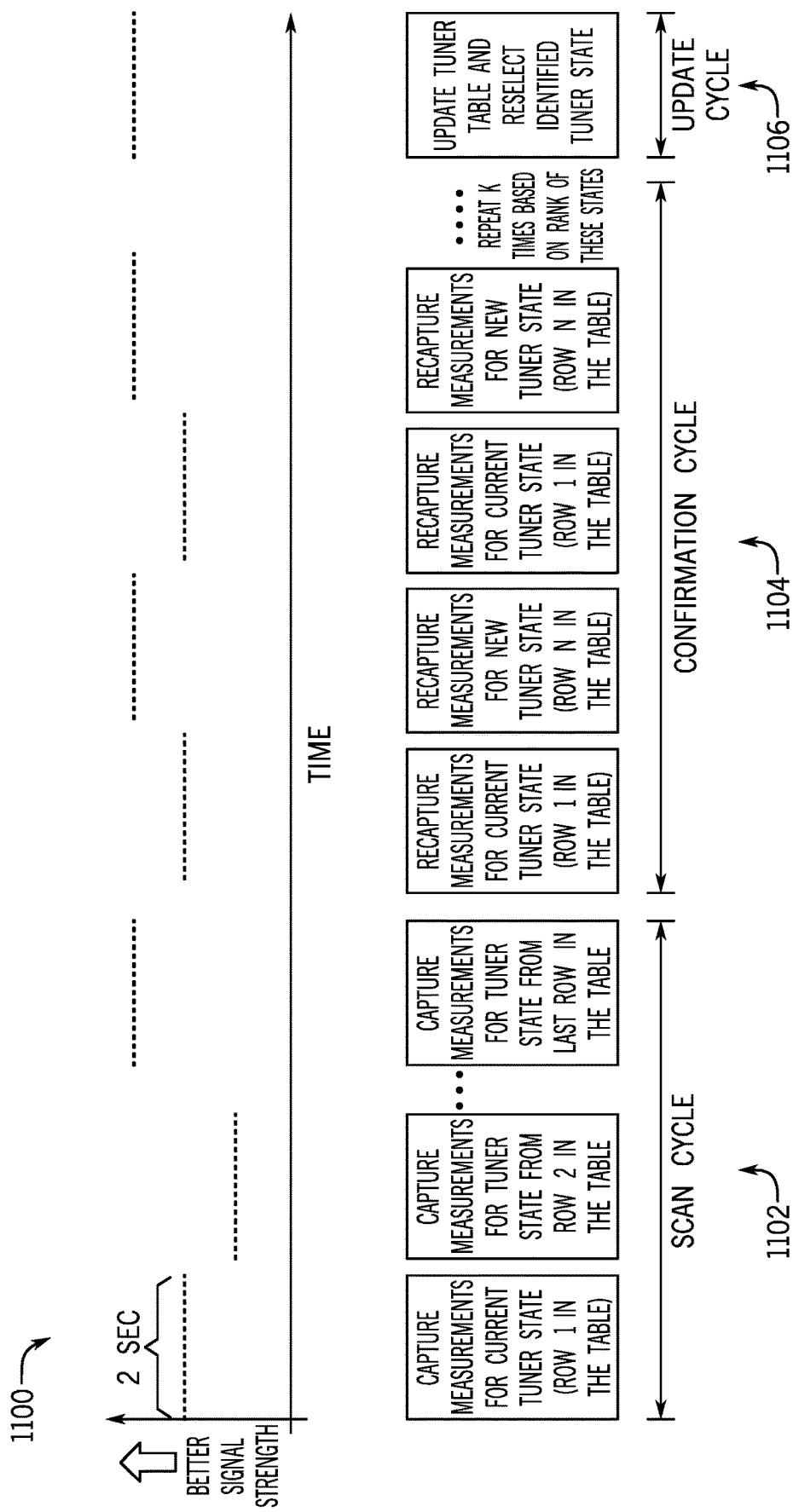
FIG. 11 is a timing diagram of the process of FIG. 6, in accordance with an embodiment.

To summarize, FIG. 11 depicts a timing diagram 1100 of the process 600, in accordance with an embodiment. During the scan cycle 1102, the measurements may be captured for each current tuner state. Each scan may occur for a scan duration, which in some embodiments, may be 2 seconds. During the confirmation cycle 1104, the processor core complex 18 may compare the tuner state measurements against one another to determine candidate tuner states. For example, the measurements of tuner state in row 1 and of tuner state in row 2 may be compared as may the measurements of the tuner state in row 1 and of tuner state in row n.

The comparisons may be compared to a threshold to determine whether the candidate tuner state enables improvement in RF communication performance. For example, a comparison for row 1 and row 2 may be less than the threshold while a comparison for row 1 and row n may be greater than the threshold. Further, during the confirmation cycle 1104, confirmation tests may be performed on the tuner state pair that is greater than the threshold. For example, and as shown, the confirmation tests may include repeating the measurements for the tuner state of row 1 and the tuner state of row n. Once the new candidate tuner state has been verified to perform better than the predetermined current best tuner state, the radio frequency system 12 may enter the update cycle 1106 whereby the tuner table may be updated according to RF communication performance under the tuner state. As shown, the tuner state of row n may be ranked as the best performing tuner state in the tuning table.

By employing the techniques described above, the radio frequency system 12 may compensate for variations in antenna characteristics that cause reduced signal strength and antenna performance. The present techniques may enable the radio frequency system 12 to operate a maximum or nearly maximum signal strength, which may not have been possible when a static tuner table was used. Further, the present techniques allow for unique tuning tables for each device, thereby catering to each user and environmental condition.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a radio frequency system configured to wirelessly transmit and receive data across multiple frequency bands; and
one or more processors communicatively coupled to the radio frequency system, wherein the one or more processors are configured to:
cause the radio frequency system to obtain measurements for a current tuner state of a plurality of tuner states for a frequency band stored in a tuning table and for a candidate tuner state of the plurality of tuner states for the frequency band, each tuner state of the plurality of tuner states corresponding to different values of passive components of a tunable antenna of the radio frequency system;
cause the radio frequency system to determine whether the candidate tuner state provides better radio frequency system performance than the current tuner state for the frequency band; and
in response to determining that the candidate tuner state provides better radio frequency performance for the frequency band, re-rank at least the current tuner state and the candidate tuner state of the plurality of tuner states according to results of the radio frequency performance for the frequency band, re-order the plurality of tuner states for the frequency band based on the re-ranking, and update the tuning table to reflect that the candidate tuner state provides better radio frequency performance than the current tuner state for the frequency band.

2. The electronic device of claim 1, wherein the radio frequency system comprises the tunable antenna configured to tune to the plurality of tuner states for the frequency band.

3. The electronic device of claim 1, wherein the measurements comprise received signal strength indicator (RSSI), reference signal received power (RSRP), average carrier-to-noise density ratio of satellite vehicles (SVs), an elevation angle of the SVs, or a combination thereof.

4. The electronic device of claim 1, comprising memory configured to store the tuning table, wherein before updating the tuning table, the tuning table is configured to store the current tuner state and the candidate tuner state according to a performance rank associated with each tuner state of the plurality of tuner states for the frequency band.

5. The electronic device of claim 4, wherein the current tuner state comprises an antenna state predetermined to provide better radio frequency performance than the candidate tuner state for the frequency band.

6. The electronic device of claim 1, comprising determining that the candidate tuner state provides better radio frequency system performance than the current tuner state for the frequency band by:
determining a difference between the measurements of the candidate tuner state and of the current tuner state;
determining that the difference is within an acceptable threshold range by comparing the difference to a corresponding threshold; and
in response to determining that the difference is within the acceptable threshold range, re-obtaining the measurements for the candidate tuner state and the current tuner state for the frequency band.

7. The electronic device of claim 6, wherein re-obtaining the measurements comprises repeating the measurements a number of times, wherein the number of times is based on a rank difference between the candidate tuner state and the current tuner state.

8. The electronic device of claim 1, wherein the one or more processors are configured to:
instruct cause the radio frequency system to obtain measurements for an additional candidate tuner state of the plurality of tuner states for the frequency band;
cause the radio frequency system to determine whether the additional candidate tuner state provides better radio frequency system performance than the current tuner state for the frequency band; and
in response to determining that the additional candidate tuner state provides better radio frequency performance for the frequency band, update the tuning table to reflect that the additional candidate tuner state provides better radio frequency performance than the current tuner state for the frequency band.

9. A method, comprising:
tuning, via one or more processors, a tunable antenna of a radio frequency system according to a current tuner state of a plurality of tuner states for a frequency band stored in a tuning table, each tuner state of the plurality of tuner states corresponding to different values of passive components of the tunable antenna;
obtaining, via the radio frequency system, measurements for the current tuner state for the frequency band;
tuning, via the one or more processors, the tunable antenna of the radio frequency system according to a candidate tuner state of the plurality of tuner states for the frequency band;
obtaining, via the radio frequency system, the measurements for the candidate tuner state for the frequency band;
determining, via the one or more processors, that the candidate tuner state provides better radio frequency communication performance than the current tuner state for the frequency band; and
in response to determining that the candidate tuner state provides better radio frequency communication performance for the frequency band, re-ranking, via the one or more processors, at least the current tuner state and the candidate tuner state of the plurality of tuner states according to results of the radio frequency communication performance for the frequency band, re-ordering, via the one or more processors, the plurality of tuner states based on the re-ranking, and updating, via the one or more processors, the tuning table to reflect that the candidate tuner state provides better radio frequency communication performance than the current tuner state for the frequency band.

10. The method of claim 9, wherein the current tuner state comprises an antenna state predetermined to provide better radio frequency communication performance than the candidate tuner state for the frequency band based on empirical data obtained before implementation of the radio frequency system.

11. The method of claim 9, comprising determining that the candidate tuner state provides better radio frequency system communication performance than the current tuner state for the frequency band by:
determining, via the one or more processors, a difference between the measurements of the candidate tuner state and of the current tuner state;
determining, via the one or more processors, that the difference is within an acceptable threshold range by comparing the difference to a corresponding threshold; and
in response to determining that the difference is within the acceptable threshold range, re-obtaining, via the one or more processors, the measurements for the candidate tuner state and the current tuner state for the frequency band.

12. The method of claim 11, wherein the corresponding threshold comprises a received signal strength indication (RSSI) threshold of 2 decibel milliwatt (dBm), a reference signal received power (RSRP) threshold of 2 dBm, a current position accuracy threshold of 20 meters, a carrier-to-noise density threshold of 2 dB, or a combination thereof.

13. The method of claim 9, comprising determining, via the one or more processors, that entry criteria have been met, wherein the entry criteria comprises the radio frequency system being in service, RSRP and RSSI being above -90 dBm, no cellular traffic being present, current position accuracy between acceptable threshold range, number of satellite vehicles, environmental state of the radio frequency system, or any combination thereof.

14. The method of claim 9, determining, via the one or more processors, that exit criteria have been met, wherein the exit criteria comprises the radio frequency system losing service, cellular traffic being present, user dynamics changing, RF dynamics changing, environmental state not as intended, number of carrier-to-noise density ratio measurements, or any combination thereof.

15. The method of claim 14, wherein in response to meeting one or more exit criteria, the one or more processors perform the method again.

16. A non-transitory machine-readable medium, comprising computer-executable instructions, when executed, are configured to cause one or more processors to:
cause a radio frequency system to obtain measurements for a current tuner state of a plurality of tuner states for a frequency band stored in a tuning table and for a candidate tuner state of the plurality of tuner states for the frequency band, each tuner state of the plurality of tuner states corresponding to different values of passive components of a tunable antenna of the radio frequency system;
determine whether the candidate tuner state provides better radio frequency system performance than the current tuner state for the frequency band; and
in response to determining that the candidate tuner state provides better radio frequency performance for the frequency band, re-rank at least the current tuner state and the candidate tuner state of the plurality of tuner states according to results of the radio frequency performance for the frequency band, re-order the plurality of tuner states for the frequency band based on the re-ranking, and update the tuning table to reflect that the candidate tuner state provides better radio frequency performance than the current tuner state for the frequency band.

17. The non-transitory machine-readable medium of claim 16, comprising the instructions for determining that the candidate tuner state provides better radio frequency system performance by comparing radio frequency system performance under each tuner state of the plurality of tuner states for the frequency band and repeating the measurements to verify that the candidate tuner state provides better radio frequency system performance for the frequency band.

18. The electronic device of claim 1, wherein the passive components comprise one or more inductors, one or more capacitors, or a combination thereof, of the tunable antenna.

* * * * *